United States Patent [19]

Kent

[11] Patent Number: 5,122,026
[45] Date of Patent: Jun. 16, 1992

[54] CARGO PLATFORM WITH PLURAL STORAGE POSITIONS

[75] Inventor: Douglas H. Kent, Mariemont, Ohio

[73] Assignee: Leyman Manufacturing Corp., Cincinnati, Ohio

[21] Appl. No.: 583,868

[22] Filed: Sep. 17, 1990

[51] Int. Cl.$^5$ ............................................. B60P 1/46
[52] U.S. Cl. ........................................ 414/545; 414/558; 414/786; 187/9 R
[58] Field of Search .............. 414/539, 540, 545, 558, 414/786; 187/9 R

[56] References Cited

U.S. PATENT DOCUMENTS

| | | | |
|---|---|---|---|
| Re. 31,157 | 2/1983 | Perkins | 414/545 |
| 3,371,805 | 3/1968 | Himes | 414/545 |
| 3,734,239 | 5/1973 | Martin et al. | 187/9 R |
| 3,791,541 | 2/1974 | Himes | 414/545 |
| 4,087,007 | 5/1978 | Drews | 414/545 |
| 4,563,121 | 1/1986 | Drews | 414/545 |
| 4,576,541 | 3/1986 | Dunn et al. | 414/545 |
| 4,579,503 | 4/1986 | Disque | 414/545 |
| 4,806,062 | 2/1989 | Stier | 414/545 |
| 4,854,804 | 8/1989 | Mayle | 414/540 X |

Primary Examiner—Robert J. Spar
Assistant Examiner—James Keenan
Attorney, Agent, or Firm—Wood, Herron & Evans

[57] ABSTRACT

A cargo platform system particularly structured for use with, e.g., a truck body's cargo opening. The system includes a mast asembly with a mast guide and a mast movably supported by the guide, the mast assembly being fixed to one vertical side edge of the cargo opening. A cargo platform is pivotally connected to the mast, the platform being swingable relative to the mast between a horizontal elevator position and a vertical storage position. A latch system partially carried by the mast guide and partially carried by the mast allows the mast and mast guide to be latched together so that substantially no relative movement therebetween is possible in a first latched position when the platform is in its storage position and located entirely below the truck body's cargo floor and also in a second latch position when the platform is in the storage position and located substantially above the cargo floor.

8 Claims, 6 Drawing Sheets

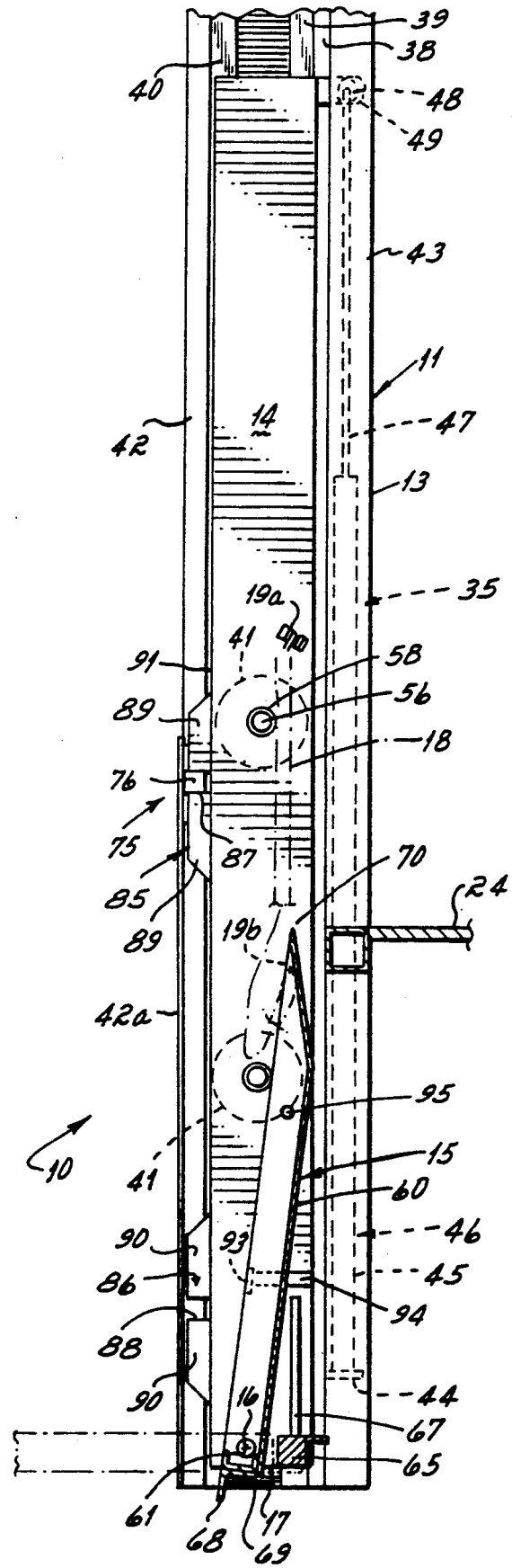
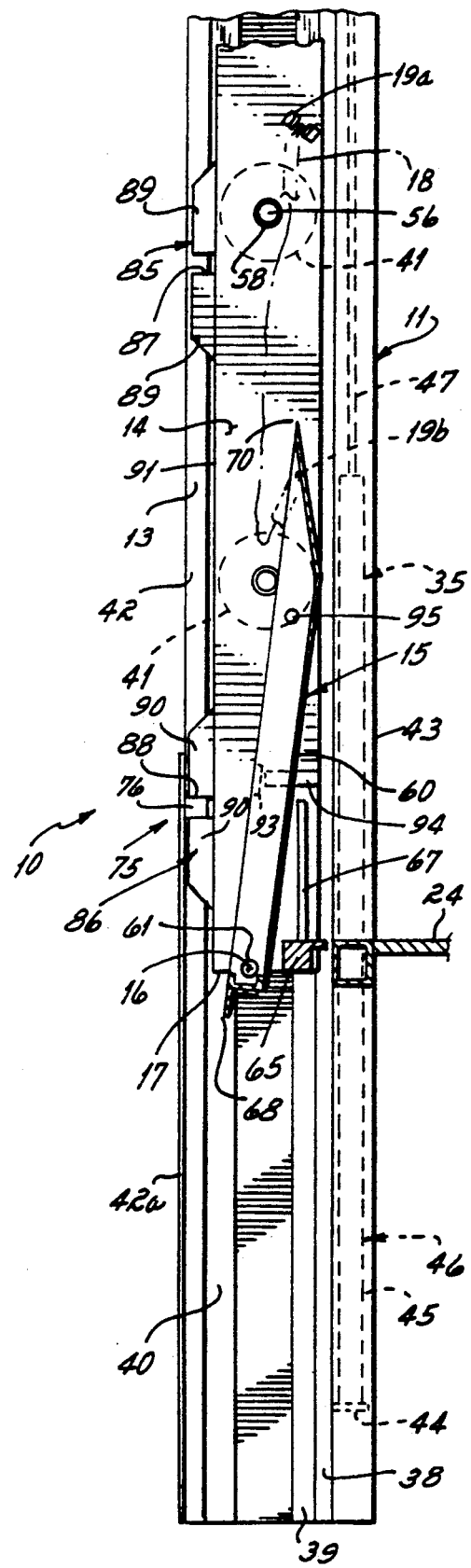
FIG. 6
FIG. 7

CARGO PLATFORM WITH PLURAL STORAGE POSITIONS

FIELD OF THE INVENTION

This invention relates to cargo platform systems. More particularly, this invention relates to a cargo platform system with a cargo platform that has plural latched storage positions when the platform is in its vertical storage orientation.

DESCRIPTION OF THE RELATED ART

Cargo platforms that are operable as elevators, and that are storable somewhere about a truck's cargo body so as to be movable with the truck, are well known in the prior art. Generally, such cargo platforms are mounted in combination with a special elevating and storing mechanism that is supported by, i.e., fixed to, the sides, ends or bed of the truck's cargo body. When a cargo platform, in combination with the combined elevating and storing mechanism, is used as an elevator, the cargo platform is first moved from its storage position to its horizontal or cargo loading position. Once in the horizontal position, the platform may be moved up and down between the bed or floor of the truck and ground level or a loading dock. Such elevator-like movement allows quick, efficient loading and unloading of the truck's cargo space by providing lift means which permit the platform to be moved to a first loading level for easy transferal of the cargo onto the platform and, then, to be raised or lowered in a horizontal plane to a second unloading level for easy transferal of the cargo off the platform.

One basic type of cargo platform system above described that has seen significant commercial success in the marketplace makes use of two mast assemblies, one mounted to each vertical side edge of a truck body's cargo opening. Each mast assembly is comprised of a mast guide and a mast movably supported by that guide. A cargo platform is pivotally connected between the masts adjacent their lower ends, the platform being swingable relative to the masts between its horizontal elevator position and a vertical storage position. A motor system is connected with the masts for moving the masts up and down relative to ground, thereby operating the cargo platform as an elevator between truck floor and ground when the cargo platform is in its horizontal position. After the truck has been unloaded or onloaded with the cargo platform in the horizontal position, the platform is then translated into its vertical storage position where it is substantially parallel to the truck body's cargo opening. In this platform storage position, the vertically cargo platform is upraised relative to ground level until it is located substantially above the truck's floor level where it, in effect, acts as a tailgate. And it has been in this tailgate position that prior art cargo platforms in this type of cargo platform system have been stored during the truck's over-the-road travel. A cargo platform system of this general structural type is illustrated in U.S. Pat. No. 4,576,541 entitled Safety Latch For A Cargo Platform.

A truck with a cargo platform system of the type described in the above paragraph may be called upon to make cargo deliveries at different locations that are either close to one another, or relatively far away from one another. In other words, and more specifically, a truck with such a cargo platform system may make a series of deliveries within the same city or town where the delivery sites are relatively close to one another and/or it may make deliveries between different cities and towns where those cities and towns are located relatively far away from one another. Now where delivery sites are located relatively close to one another, and with the type of cargo platform system described above, it is somewhat time consuming to continually store and re-store the vertically disposed cargo platform above the truck body's floor after successive deliveries. In other words, it may be desirable simply to leave the vertically disposed cargo platform in a storage position beneath the truck body's floor when successive delivery sites are relatively close one to another so as to minimize elevator set up time for the cargo platform at a successive delivery site. On the other hand, when successive delivery sites are relatively far away from one another, and in order to minimize wind resistance and thereby enhance gasoline mileage for the truck, it is desirable to locate the vertically stored cargo platform above the truck body's cargo floor. So in local delivery situations where the distance between delivery sites is relatively short, and where the truck speed is not significant so that wind resistance because of the vertically stored platform located beneath the truck's floor is not significant, it is desirable to store the cargo platform in a first storage location that makes it easier for the truck driver to more easily and quickly start use of the elevator platform at the successive delivery site. On the other hand, and in over-the-road situations where the distance between delivery sites is significant, in order to minimize wind resistance it is desirable to store the vertically folded cargo platform in a second storage locator substantially above the truck body's floor.

SUMMARY OF THE INVENTION

Accordingly, it has been the primary objective of this invention to provide an improved cargo platform system for use with a cargo floor elevated above ground, e.g., for use with a truck body at the truck body's cargo opening, which is of the type that includes a mast assembly having a vertical mast guide fixed relative to the cargo floor and a mast movably supported by that guide, and that includes a cargo platform pivotally connected to the mast so it is swingable between a horizontal elevator position and a vertical storage position, the cargo platform system including a latch system partially carried by the mast guide and partially carried by the mast that allows the mast and mast guide to be latched together so that substantially no relative movement therebetween is possible in a first latched position when the cargo platform is in its vertical storage position and located substantially below the cargo floor, and also in a second latched position when the cargo platform is in its vertical storage position and located substantially above the cargo floor.

It has been another objective of this invention to provide an improved cargo platform system of the type described in the paragraph above where a truck's cargo opening has a door hingedly connected to the mast guide, the door being adapted to at least partially close access to the truck's cargo floor when the mast and mast guide are in both of the first and second latched positions.

BRIEF DESCRIPTION OF THE DRAWINGS

Other objectives and advantages of this invention will be more apparent from the following detailed description taken in conjunction with the drawings in which:

FIG. 6 is a cross sectional view taken along line 6—6 of FIG. 2; and

FIG. 7 is a cross sectional view taken along line 7—7 of FIG. 3.

DESCRIPTION OF THE PREFERRED EMBODIMENT

Figure 1:
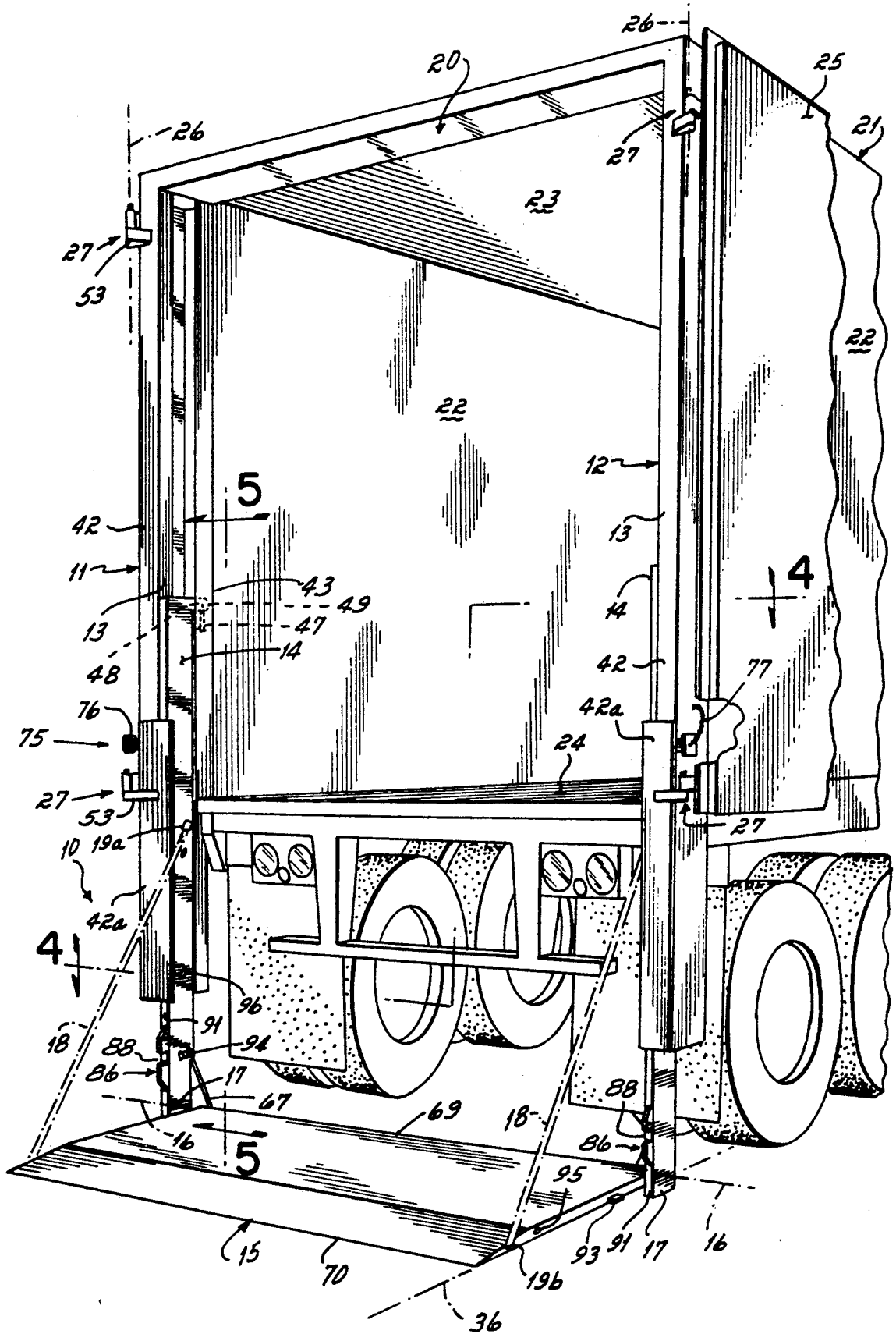
FIG. 1 is a rear perspective view of a cargo platform system in accord with the principles of this invention, the cargo platform being illustrated in horizontal elevator position and at ground level.
Figure 2:
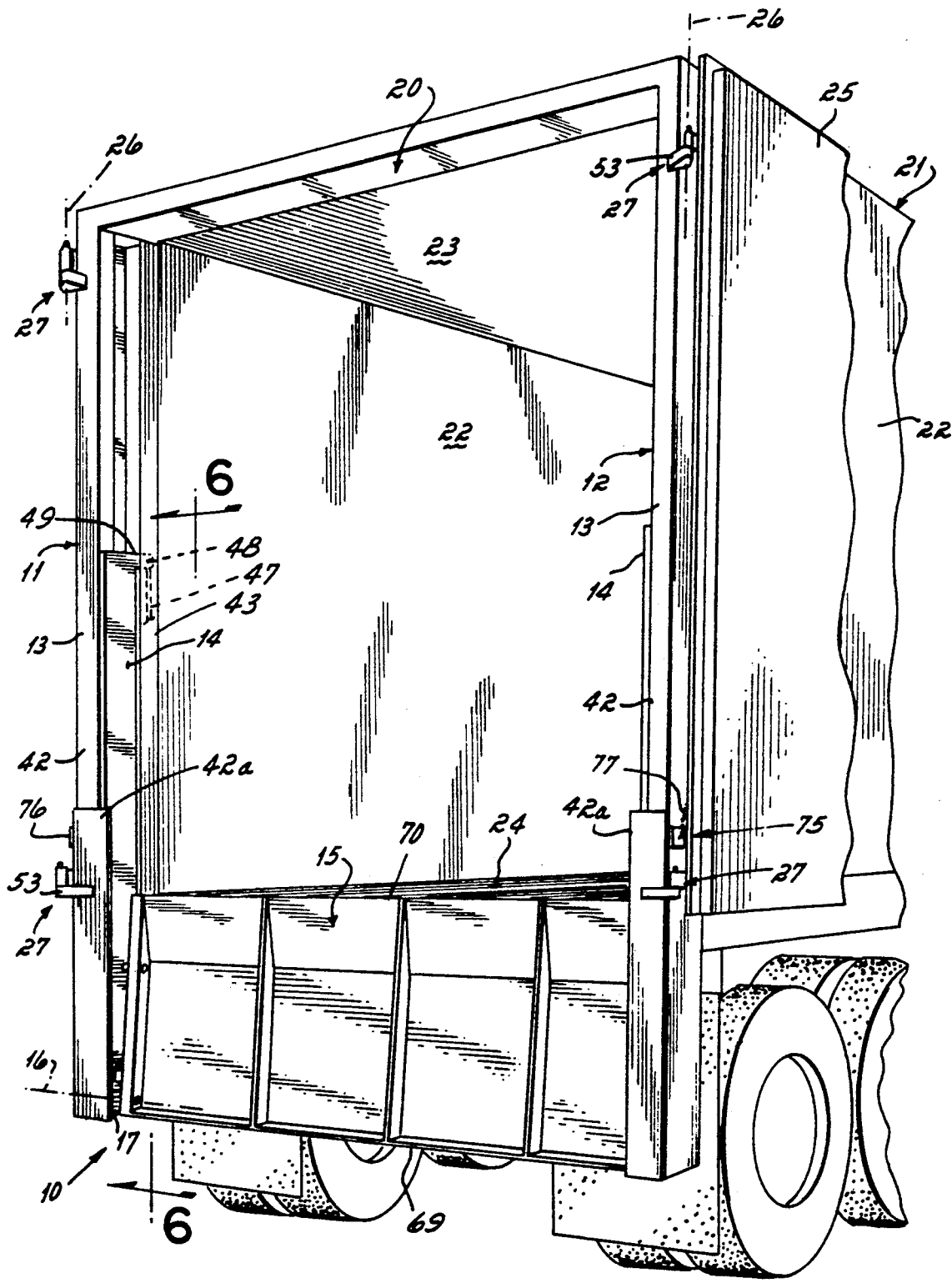
FIG. 2 is a rear perspective view similar to FIG. 1 but illustrating the cargo platform in a first vertical storage position located below a cargo floor.
Figure 3:
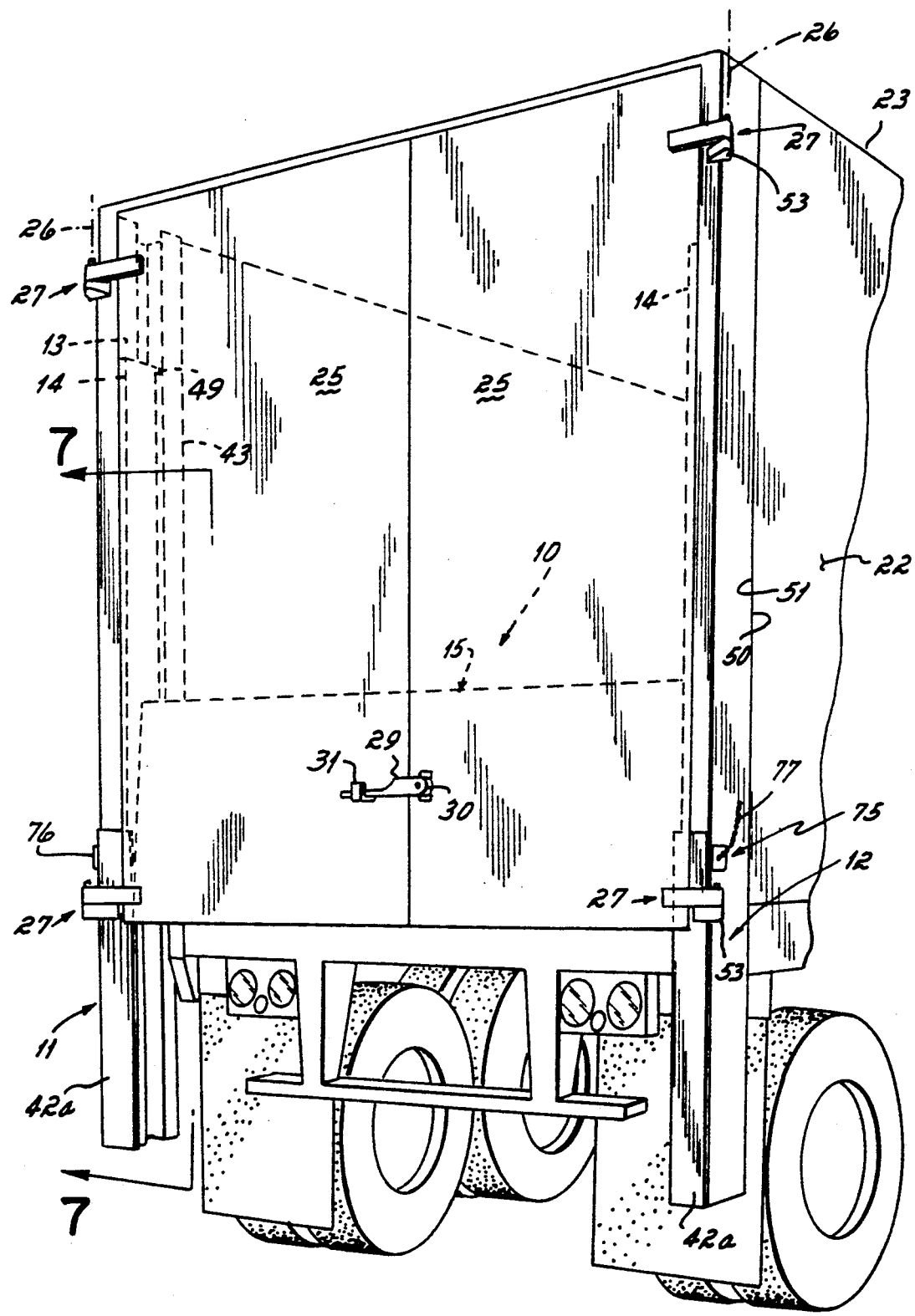
FIG. 3 is a rear perspective view similar to FIGS. 1 and 2 illustrating the cargo platform in a second vertical storage position elevated substantially above the cargo floor with truck doors in closed over-the-road position.

The basic components of a cargo platform system 10 in accord with the principles of this invention are illustrated in FIG. 1. The system includes two mast assemblies 11, 12, each of which incorporates a mast guide 13 and a mast 14 movably supported by the mast guide. A cargo platform 15 is pivotally connected on swing axis 16 to the bottom end 17 of each mast 14, the platform being swingable relative to the mast between a horizontal elevator position as illustrated in FIG. 1 and a vertical storage position as illustrated in FIG. 2. Opposed chains 18, each of which is fixed at one end 19a to a mast 14 and at the other end 19b to an adjacent side edge of the cargo platform 15, retain the cargo platform in its horizontal elevator position shown in FIG. 1. A latch (described below) holds the cargo platform 15 in vertical storage position with the masts 14 when the platform is so oriented. The cargo platform system 10 is attached to the cargo opening 20 of a truck body 21. The truck body 21 is comprised of opposed side walls 22, ceiling 23 and a cargo floor or bed 24. Opposed doors 25, each disposed on a vertical hinge line 26 and connected by hinges 27 to the mast guide 3, open and close the truck body's interior to access for loading and unloading purposes. As seen in FIG. 3, the doors 25 are held in closed position by a latch handle 29 swingable on pin 30 that cooperates with keeper 31.

Figure 4:
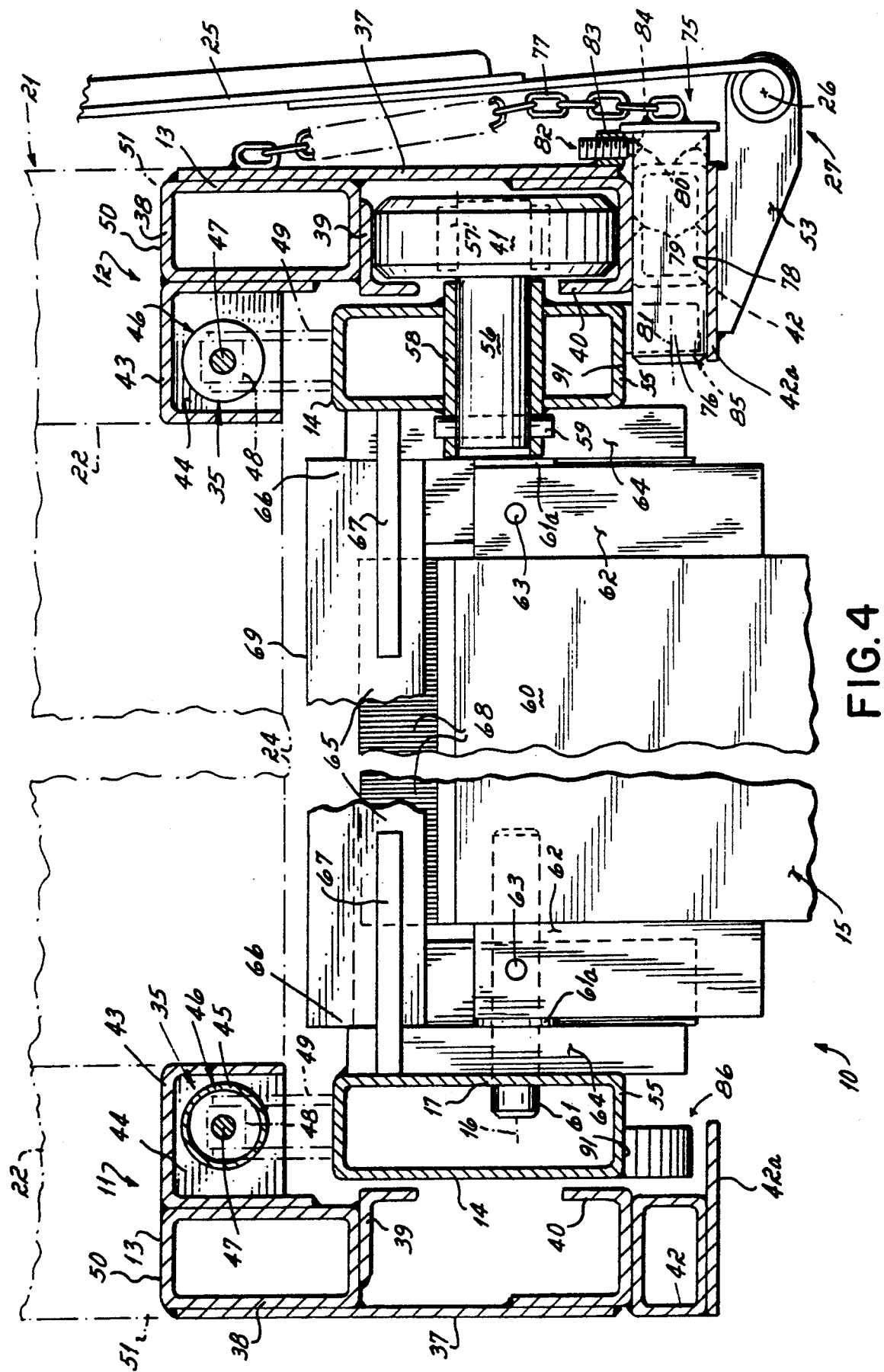
FIG. 4 is a cross sectional view taken along the line 4—4 of FIG. 1 illustrating on the left side the structural detail of the platform attached to the mast and on the right side a platform roller and latch system structure.
Figure 5:
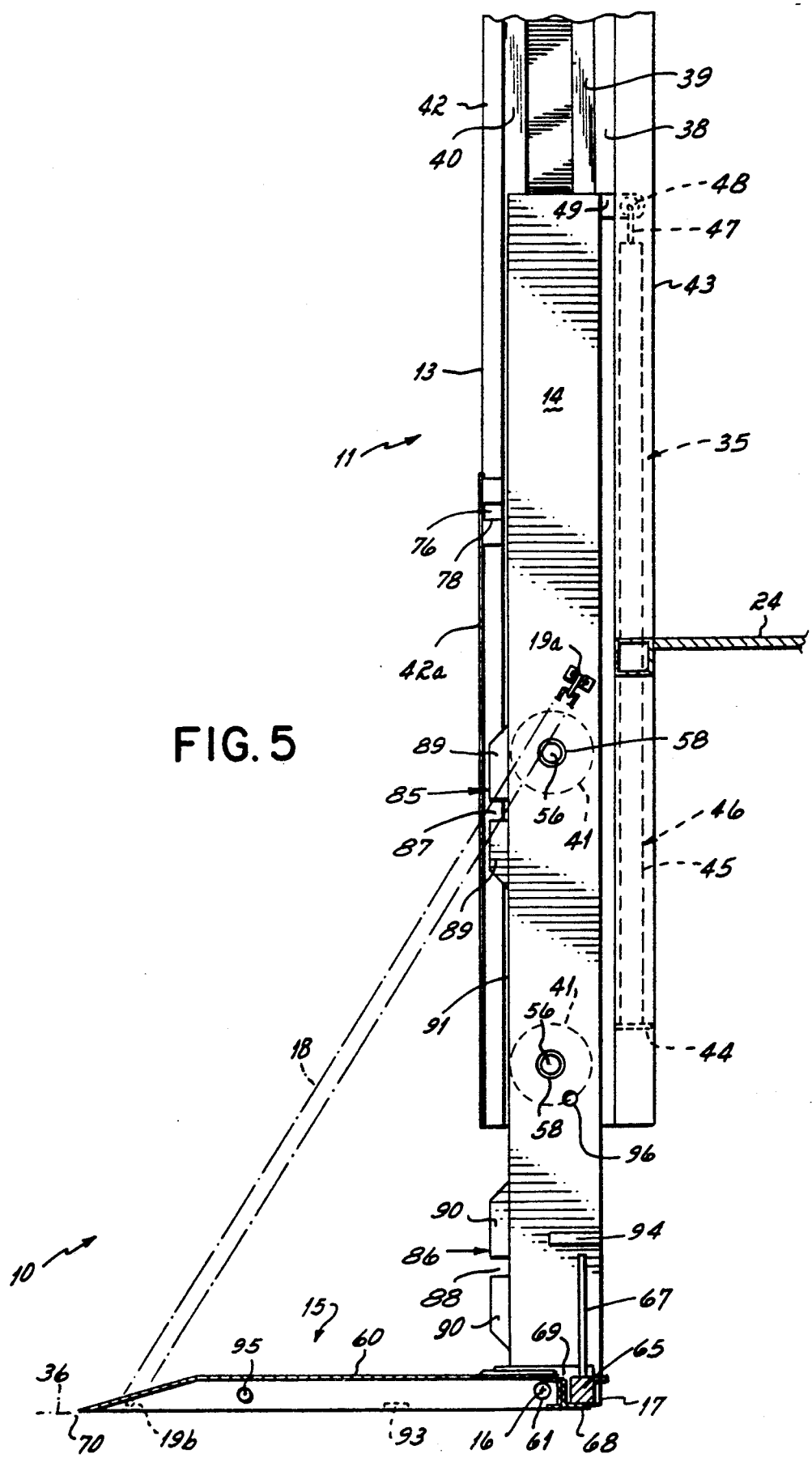
FIG. 5 is a cross sectional view taken along line 5—5 of FIG. 1.

The mast assemblies 11, 12 of the cargo platform system 10 are particularly illustrated in FIGS. 4 and 5. Each of the mast assemblies 11, 12 is identical one with the other. Each mast assembly 11, 12 includes, as noted, a mast guide 13 and a mast 14 movably supported by that mast guide. A motor system 35 is connected with each mast 14 for vertically moving that mast up and down relative to the mast guide 13 in order to operate the cargo platform 15 as an elevator between the truck floor 24 and ground 36. The mast guide 13 is comprised of a face plate 37 with a first vertical tubular support post 38 located at one end. The support post 38 mounts a vertical roller track defined by angle piece 39. An opposing roller track defined by vertical U-shaped member 40 is also fixed to the face plate 37. These roller tracks cooperate to define a vertical path for a pair of rollers 41, further described below, which are fixed to the mast 14. A second vertical tubular support post 42 is fixed to the U-shaped member 40. As best seen in FIGS. 1 and 5, a guard plate 42a is fixed to the lower end of the support post 42 between its lowermost end and a point above a latch pin bore (to be described).

A motor housing 43 of generally U-shaped configuration is fixed to the mast guide's first support post 38 on that post's inside face. This vertically oriented motor housing 43 is provided with a floor 44 at its bottom end so that cylinder 45 of a hydraulic motor 46 can be fixed to the floor in immobile position relative to the mast guide 13. The hydraulic motor's piston rod 47 is pivotally connected as at 48 with an arm 49 fixed to the inside top end of the mast 14 as shown in FIG. 5. Accordingly, and as the piston rod 47 is extended upwardly or retracted downwardly relative to the motor cylinder 45, the mast 14 is similarly extended upwardly or retracted downwardly within the mast guide 13. The hydraulic motors 46 carried within the mast guides 13 are connected with a hydraulic pump (not shown) and an electric control system (not shown) for that pump. It is the hydraulic pump, through use of the electric controls, that causes the hydraulic motors to raise or lower the cargo platform 15 when it is in the elevator position.

The motor housing 43 and first tubular support 38, i.e., the inner end surface 50 of the mast guide, are fixed to the rear end side wall edge 51 of the truck body 21. Thus, each mast guide 13 is fixed to one of the truck's side walls 22, as shown in FIGS. 1 and 4. The outer end surface and the plate 42a of the mast guide 13 carries spaced hinged plates 53 for each of the truck doors 25. Thus, a door 25 is mounted to each mast guide 13 on a vertical hinge line 26 defined by the hinge plates 53 as shown in FIG. 1 and 4.

The mast 14 slidably received in each mast guide 13 for each mast assembly 11, 12 is illustrated at the right of FIG. 4 and in FIG. 5. The mast 14 is comprised of a vertical tubular member 55 with the pair of rollers 41 connected to it, the rollers being adapted to ride in the mast guide's tracks 39, 40 as previously mentioned. Each roller 41 is carried on a stub axle 56, and rotates relative to that axle on needle bearings 57. Each roller 41 is connected to the mast 14 through use of a bearing sleeve 58 fixed to the mast that receives the stub axle 56. The stub axle 56 is held in fixed position with the bearing sleeve 58 by roll pin 59.

As seen in the left of FIG. 4 and in FIG. 5., the cargo platform 15 is comprised of a floor 60 pivotally connected on swing axis 16 to the bottom ends 17 of opposed masts 14 by stub axles 61 fixed to the cargo platform. Each stub axle 61 is fixed to axle block 62 mounted on the side of the floor 60, the stub axle being held in immobile assembly with that axle block by pin 63. Each stub axle 61 is received in pivotable relation with bearing block 64 fixed to the bottom end 17 of mast 14, a washer 61a being interposed between the cargo platform's axle block 62 and the mast's bearing block 64, thereby mounting the cargo platform in pivotal relation with the masts 14.

A safety tie bar 65 is connected between the masts 14 at their bottom ends, the safety tie bar being connected at opposed ends 66 to those opposed bearing blocks 64, see FIGS. 4–7. The safety tie bar 65 is located on that side of the platform swing axis 16 which is opposite to that side on which the platform 60 is located. A brace plate 67 reinforces the safety tie bar 65 connection to each mast's bearing block 64. A safety lip 68 that extends along the cargo floor's truck edge 69 is adapted to interact with the safety tie bar 65 carried by the masts 14 so as to prevent the cargo platform 15 from swinging substantially downwardly beyond its horizontal elevator position shown in FIG. 1 if the chains 18 break when the cargo platform is being used as an elevator. In other words, if the cargo platform 15 was to try to swing downwardly beyond the horizontal use position, the platform's safety lip 68 would interengage the masts' safety tie bar 65 so as to prevent the cargo platform from swinging any farther downwardly, see FIG. 5.

The cargo platform 15 is held in its horizontal elevator position by chains 18 on opposite sides of the cargo floor 60, one end 19a of each chain being fixed to a mast 14 and the other end 19b of each chain being fixed to the floor adjacent the free or rear edge 70 thereof, as earlier noted. These chains 18 allow the cargo platform 15 to be moved manually between the horizontal elevator use position shown in FIG. 1 and the vertical storage position shown in FIG. 2. While a manual chain 18 system has been shown, this invention also is useful with an automatic system which translates the cargo platform 15 between its vertical storage and horizontal use positions as desired upon raising and lowering of the masts 14 relative to the mast guides 13. Such an automatic opening and closing system is illustrated in U.S. Pat. No. 4,576,541 entitled Safety Latch For A Cargo Platform, the disclosure of which is incorporated herein by reference. Also, the cargo platform 15 illustrated herein has been shown with an integral one piece or non-sectional floor 60. It is also known to the cargo platform art to bifurcate the cargo platform so that an extended length cargo platform can be used which may accommodate larger cargo handling equipment. Such a bifurcated or double-section cargo platform is also illustrated in U.S. Pat. No. 4,576,541 aforementioned, the disclosure of which is incorporated herein by reference.

A latch system 75 for each mast assembly 11, 12 that permits the cargo platform 15 to be located in two different vertical storage positions (compare FIGS. 2 and 6 with FIGS. 3 and 7) relative to ground is illustrated in FIGS. 1, the right side of FIG. 4, and 5–7. This latch system 75 is partially carried by mast guide 13, and is partially carried by mast 14. The latch system 75 for each mast assembly 11, 12 allows the masts 14 and mast guides 13 to be latched together so that substantially no relative movement therebetween is possible in a first latched position when the cargo platform 15 is in its vertical storage position and located substantially entirely below the cargo floor 24 as illustrated in FIGS. 2 and 6. The latch system 75 also allows the mast 14 and mast guide 13 of each mast assembly 11, 12 to be latched together so that substantially no relative movement therebetween is possible in a second latched position when the cargo platform is in its vertical storage position substantially entirely above the cargo floor 24 as illustrated in FIGS. 3 and 7. More particularly, the latch system 75 associated with each mast assembly 11, 12, as illustrated particularly in FIGS. 4 and 6, is comprised of a latch key in the form of a square shot pin 76 operably connected in a single vertical position relative to ground 36 to the mast guide 13. This shot pin 76 is connected at one end to a chain 77, the chain's other end being connected to the mast guide 13 so that in the event the latch pin becomes disengaged with the mast guide it will not be lost. The shot pin 76 is received in a square space 78 defined by upper and lower segments of tubular post 42, the wall of track element 40 and plate 42a. Note particularly the shot pin 76 includes a pair of inner and outer detents or notches peripheral grooves 79, 80 spaced one from the other in planes generally normal to the pin's longitudinal axis 81. These detents 79, 80 cooperate with a spring loaded ball plunger 82 threadedly adjustable in a sleeve 83 fixed to the mast guide's face side plate 37. The plunger 82 has a ball 84, biased by a compression spring (not shown), that is engageable with the detents 79, 80 to hold the shot pins in a selection position. When the spring loaded plunger 82 interengages the shot pin's detent 80, the shot pin 76 is in its innermost position as illustrated in FIG. 4, and this constitutes a latching position with the associated mast 14. When the spring loaded plunger 82 is interengaged with the shot pin's detent 79, the shot pin 76 is in its outermost position as illustrated in FIG. 1 where the shot pin is disengage with the mast 14 so that the cargo platform can operate in its elevator fashion.

The latch system 75 also includes upper and lower keyways 85, 86 that are defined on the mast 13. These two keyways 85, 86 which in the embodiment shown are in the nature of slots 87, 88 defined by upper and lower locator plates 89, 90, fixed to the side edge 91 of the mast 14, are spaced a distance one from the other along the length of the mast so that when the shot pin 76 is received in one of the slots 87 or 88, the mast guide 13 and mast 14 are latched together in a first latch position, and so that when the shot pin is received in the other of the keyways the mast guide and mast are latched together in a second latch position. The upper latch position on the mast 14 allows the vertically oriented cargo platform 15 to be stored in a lower storage position entirely below the truck's cargo floor 24 as illustrated in FIGS. 2 and 6. The lower latch position on the mast 14 allows the vertically oriented cargo platform 15 to be stored in an upper storage position where it is located substantially entirely above the cargo floor 24 as illustrated in FIGS. 2 and 7. Note particularly, therefore, that the keyways 85, 86, which are in the nature of slots 87, 88, are located on the mast 14 so that both keyways move up and down relative to ground 36 as the masts themselves move up and down relative to ground. On the other hand, the shot pin 76 itself, being slideably disposed in a single port 78 in the mast guide 13, is fixed relative to ground 36 since the mast guide itself is fixed relative to ground.

In use with the cargo platform system 10 of this invention, and when it is desired to operate the cargo platform 15 in elevator fashion as illustrated in FIG. 1, each shot pin 76 is first withdrawn from interengagement with that keyway 85 or 86 with which it may have been engaged. In other words, each shot pin 76 is withdrawn until the spring loaded plunger 82 engages peripheral groove 79 on the pin so that the pin is no longer received in a keyway 85 or 86 on the mast 14. In this attitude, and with the cargo platform located in the horizontal elevator position illustrated in FIG. 1 as defined by the chains 18, the motor system 35 can raise and lower the elevator platform between the truck's cargo floor 24 and ground 36 as desired to load or unload the truck body.

When it is desired to store the cargo platform 15, and if the next delivery or pick up site is not far away, the truck driver may selectively choose to store the platform beneath the cargo floor 24 as illustrated in FIGS. 2 and 6 and then close the truck doors 25. In order to effect the FIG. 2 and 6 storage arrangement, the masts 14 are oriented by the motor system 35 relative to the mast guides 13 until the upper latch keyways 85 are operably positioned opposite the shot pins 76 at which location the shot pins are interengaged with those upper latch keyways. In this attitude, the masts 14 are now held immobile relative to the mast guides 13, and the hydraulic system that powers the hydraulic motors 46 may be disengaged. With the masts 14 now latched in the FIG. 2 and 6 position relative to the mast guides 13, the cargo platform 15 can now be manually pivoted on pivot axis 16 into its vertical storage position having abutment 93 against stop 94. When in this storage position, the platform is latched to the masts by a keeper pin 95, slideably mounted in platform 15 being inserted into a hole 96 of mast 14. The doors 25 are subsequently closed and latched by latch arm 29 and keeper 31, the truck now being ready for movement to another delivery site close by. Note particularly that if this subsequent delivery site requires unloading at a cargo dock which is at truck bed height, as opposed to unloading at ground level, then the truck body 21 need simply be backed up to that loading dock after the doors 25 have been opened. In other words, the cargo platform 15 does not have to be moved or otherwise operated if the next delivery or pick up site is at loading dock height level because the truck doors 25 need merely be opened and the truck bed 24 backed up to that loading dock.

Now if the next delivery site or pick up is a substantial distance away, and in order to minimize air drag on the truck and enhance gasoline mileage, it may be desired to store the cargo platform 15 in a vertical position where it is substantially entirely located above truck bed level as illustrated in FIGS. 3 and 7. If this storage position is desired relative to the FIG. 1 elevator position, then with the cargo platform 15 in the FIG. 1 position the masts 14 are moved until the lower keyways 86 are aligned with shot pins 76. When the lower keyways 86 are so aligned with the shot pins 76, as particularly illustrated in FIG. 7, the shot pins are interengaged with those lower keyway slots 88 so as to latch the masts 14 and mast guides 13 together. In this upper storage position for the cargo platform 15, the cargo platform is then manually pivoted from the horizontal elevator position into the vertical storage position shown in FIGS. 3 and 7 at which it is itself latched to the masts 14 by the keeper pin 95. The doors are then subsequently closed, as illustrated in FIG. 3, for over-the-road travel.

Having described in detail the preferred embodiment of my invention, what I desire to claim and protect by Letters Patent is:

1. A cargo platform system for use with a cargo floor elevated above ground, said assembly comprising
    a mast assembly having a mast guide and a mast movably supported by said guide,
    a cargo platform pivotally connected to said mast, said cargo platform being swingable relative to said mast between a horizontal elevator position and a vertical storage position,
    a motor system connected with said mast for moving said mast relative to said mast guide in order to operate said cargo platform as an elevator between said cargo floor and ground, and
    a latch system partially carried by said mast guide and partially carried by said mast, said latch system allowing said mast and mast guide to be latched together so that substantially no relative movement between said mast guide and said mast is possible in a first latched position when said cargo platform is in said vertical storage position and located substantially entirely below said cargo floor and also in a second latch position when said cargo platform is in said vertical storage position and located substantially entirely above said cargo floor.

2. A cargo platform system as set forth in claim 1, said latch system comprising
    a latch key operably connected in a single vertical position relative to ground to one of said mast guide and said movable mast, and
    structure defining two keyways in the other of said mast guide and said mast, said latch key being receivable in each of said keyways, said keyways being spaced a distance one from the other along the length of said other of said mast guide and said mast so that when said latch key is received in one of said keyways said mast guide and said mast are latched together in said first latch position and so that when said latch key is received in the other of said keyways said mast guide and said mast are latched together in said second latch position.

3. A cargo platform system as set forth in claim 2, said latch key being connected to said mast guide in a single vertical position relative to ground.

4. A cargo platform system as set forth in claim 3, said latch key being in the form of a shot pin slideable in a slot formed in said mast guide, and said two keyways being in the form of mating slots formed in said mast.

5. A cargo platform system as set forth in claim 2, said system comprising
    a locator device mounted to said mast assembly, said device cooperating with said latch key to retain said latch key in latched assembly with the desired keyway, and also out of latched assembly with either keyway, as desired by the user.

6. A cargo platform system as set forth in claim 2, said system comprising
    a door hingedly connected to said mast guide, said door being adapted to at least partially close access to said cargo floor when said mast and mast guide are in each of said first and second latched positions.

7. A method of storing a cargo platform relative to a truck body's cargo opening, said cargo platform being pivotally connected to a mast movably supported by a mast guide fixed to said truck body, said cargo platform being swingable relative to said mast between a horizontal elevator position and a vertical storage position, said method comprising the steps of
    selectively latching said mast to said mast guide in one of a first latched position and a second latched position so that substantially no relative movement between said mast and said mast guide is possible, said first latched position being at a location where said cargo platform is in said storage position and located substantially entirely below said cargo floor, and
    said second latched position being at a location where said cargo platform is in said storage position and located substantially entirely above said cargo floor,
    thereby allowing a user of said truck body to select one of said two separate latch positions for said cargo platform when said cargo platform is in said storage position.

8. A method as set forth in claim 7, said method comprising the step of
    closing a door over at least a portion of said cargo opening whether said mast and said mast guide are latched in either one of said first and said second latched positions.

* * * * *

UNITED STATES PATENT AND TRADEMARK OFFICE
CERTIFICATE OF CORRECTION

PATENT NO.   : 5,122,026
DATED        : June 16, 1992
INVENTOR(S)  : Douglas H. Kent It is certified that error appears in the above-identified patent and that said Letters Patent is hereby corrected as shown below:

Col. 3, Line 48 delete "3" and insert -- 13 --

Col. 6, Line 18, delete "disengage" and insert -- disengaged --

Col. 6, Line 57 after "platform" insert --15--

Signed and Sealed this

Second Day of November, 1993

Attest:

BRUCE LEHMAN

Attesting Officer      Commissioner of Patents and Trademarks